Figure 1:
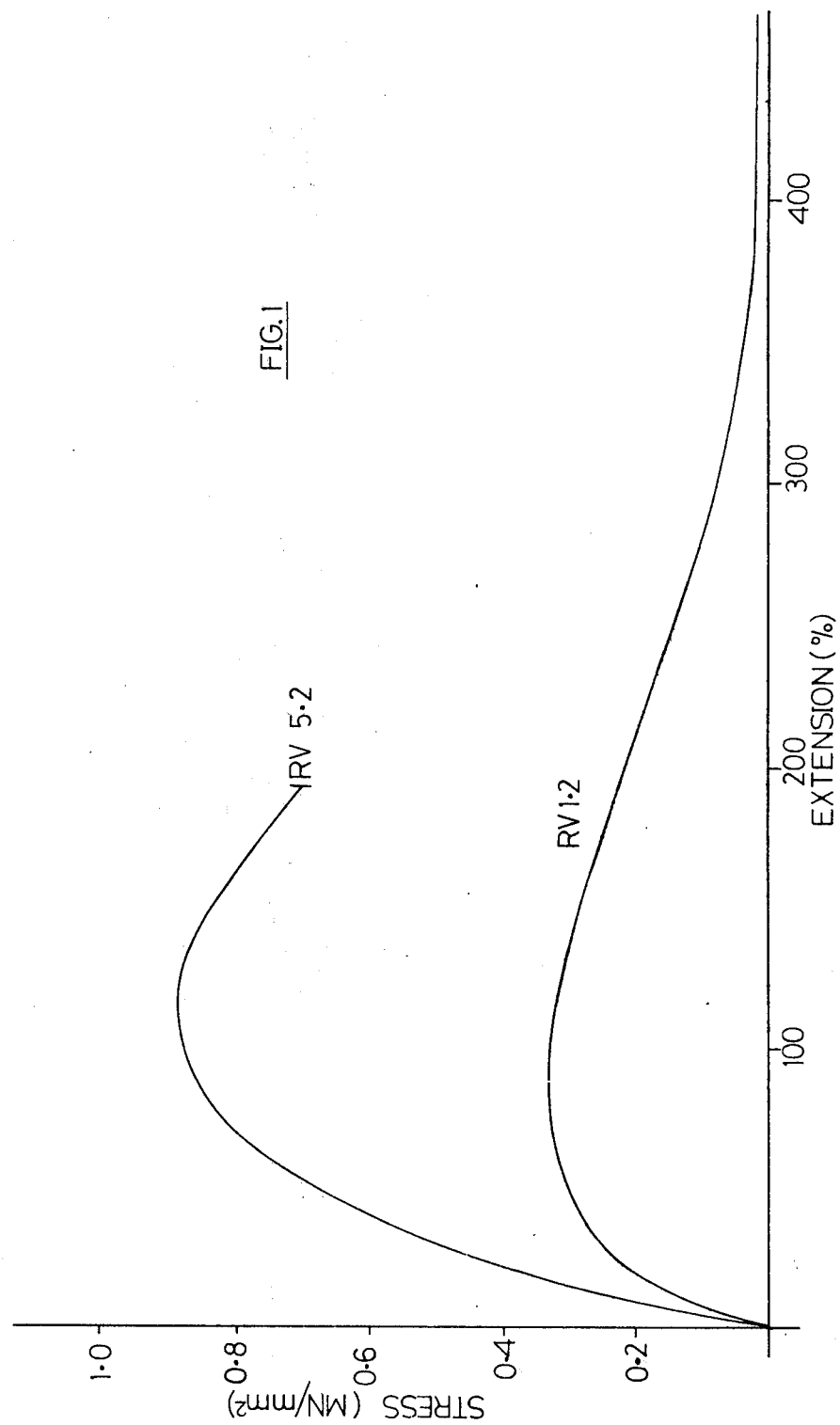

United States Patent [19]

Price

[11] 4,113,803

[45] Sep. 12, 1978

[54] ACRYLIC SHEET HAVING IMPROVED THERMOSHAPING PROPERTIES

[75] Inventor: Brian George Price, Westerhope, England

[73] Assignee: Imperial Chemical Industries Limited, London, England

[21] Appl. No.: 580,147

[22] Filed: May 23, 1975

Related U.S. Application Data

[63] Continuation of Ser. No. 363,159, May 23, 1973, abandoned.

[30] Foreign Application Priority Data

Jun. 2, 1972 [GB] United Kingdom ............... 25867/72

[51] Int. Cl.$^2$ .............................................. C08L 31/02
[52] U.S. Cl. ..................................... 260/885; 260/881
[58] Field of Search ......................................... 260/885

[56] References Cited

U.S. PATENT DOCUMENTS 3,234,194  2/1966  Slocum ................................ 260/89.5

FOREIGN PATENT DOCUMENTS 703,377  2/1965  Canada.
870,191  6/1961  United Kingdom.
1,156,424  6/1969  United Kingdom.
1,286,272  8/1972  United Kingdom.

Primary Examiner—Richard B. Turer
Attorney, Agent, or Firm—Cushman, Darby & Cushman

[57] ABSTRACT

A process for producing a thermoformable acrylic sheet comprising polymerizing an acrylic monomer in the presence of 0.02 - 3.0% by weight of a cross-linking agent, the reaction conditions being such that the fully polymerized sheet would have a reduced viscosity of 1.5 - 4.0 if cross-linking agent were absent.

8 Claims, 2 Drawing Figures

ACRYLIC SHEET HAVING IMPROVED THERMOSHAPING PROPERTIES

This is a continuation, of application Ser. No. 363,159 filed May 23, 1973, now abandoned.

This invention relates to thermoplastic sheet and more particularly to an acrylic thermoplastic sheet having improved shaping properties when thermoformed into shaped articles.

Methods for the conversion of polymerisable ethylenically unsaturated materials, such as methyl methacrylate, into sheet form are well known. Such methods include polymerisation in an extrusion process or in a casting process in which a polymer-in-monomer syrup is used. The casting process may be the process which is known as "cell casting", in which the syrup is cast in a cell which comprises a pair of rigid plates provided with a peripheral gasket of compressible material to allow for the shrinkage which occurs during the polymerisation. In this process it is usual to pour a low-viscosity polymer-in-monomer syrup containing a free-radical catalyst between the plates and to cause the material to polymerise completely under the influence of heat and, optionally, imposed pressure. Alternatively, the polymerisation may be carried out in a continuous manner in the process known as "moving-band casting". In this process the monomer or polymer-in-monomer syrup is cast and polymerised between a pair of continuous moving bands, the bands being sealed at the edges by compressible gaskets.

When a thermoplastic sheet (particularly an acrylic sheet) is to be used in shaping applications under the influence of high temperature and either vacuum or pressure, it is often found that the complexity of the article moulded is limited by the flow properties of the molten polymer. For example, when forming a re-entrant article having corners, excessive thinning of the sheet may occur at the corners. By a re-entrant is meant a concavity or other hollowed part in the side of the interior of the mould were lateral stretching of the sheet is necessary and particularly where the sheet has to be bent in the shaping process laterally through angles of the order of 90°. Thus in the reentrant the lateral area of the mould is greater than the lateral area of the opening of the mould.

An additional problem is that the rate at which shaped articles may be formed is limited by the flow properties of the molten polymer. Although the viscosity of the molten polymer may be reduced by thermoforming at elevated temperatures excessively high temperatures can result in thermal degradation of the polymers. These problems may be overcome to some extent by either including a plasticiser in the polymer or by using a sheet prepared under conditions which give a low molecular weight. These solutions however result in a deterioration in other properties of the sheet such as the mechanical properties of the sheet and the resistance to crazing. It has now been found that an acrylic sheet having improved thermoforming properties over a wide range of temperatures but retaining the superior properties of high molecular weight sheet can be made by producing a sheet containing a blend of specific cross-linked and linear fractions of acrylic polymers.

The present invention essentially provides an acrylic sheet having improved thermoforming properties which is an intimate blend of two distinct fractions having different average molecular weights. These consist of an essentially linear fraction having a relatively low molecular weight and a lightly cross-linked fraction whose molecular weight is, of course, high.

Although it has previously been known to include cross-linking agents in the polymerisation processes for acrylic sheet it has now been found that if a cross-linking agent is added at a concentration within narrow limits as hereinafter defined to monomer or a polymer-in-monomer syrup and the mixture is polymerised under conditions which are controlled to give specific amounts of substantially linear and cross-linked fractions a material of greatly enhanced thermoformability is obtained whilst retaining the advantageous properties of high molecular weight sheet.

Accordingly there is provided a process for producing a thermoformable acrylic sheet comprising polymerising an acrylic monomer in the presence of 0.02–3.0% by weight of a cross-linking agent, the reaction conditions being such that the fully polymerised sheet would have a reduced viscosity of 1.5–4.0 if cross-linking agent were absent.

By "acrylic" monomer is meant alkyl methacrylates in which the alkyl group contains from 1 to 4 carbon atoms, and in particular methyl methacrylate, containing up to 20% by weight of other copolymerisable ethylenically unsaturated monomers, and "acrylic" polymer is a polymer of such an "acrylic" monomer. The comonomer, if any, is preferably selected from other alkyl methacrylates, alkyl acrylates, styrene, α-methyl styrene and acrylonitrile.

The term "reduced viscosity" as used throughout this specification means the reduced viscosity as measured at 25° C. on a solution in chloroform containing 1 g of polymer in 1000 cm$^3$ of solution.

Although materials according to the invention can be obtained from a casting process in which the cross-linking agent is added to monomer such a process presents practical difficulties and it is more convenient to use a polymer-in-monomer syrup.

The sheet of this invention is most conveniently prepared using the casting processes hereinbefore described and in particular using a two-stage process in which a polymer-in-monomer syrup of low polymer content is first prepared and is subsequently fully polymerised in a cell to give a product in the form of a sheet.

In a preferred process it has been found that sheet having the desired properties is produced when the initial polymerisable acrylic polymer-in-acrylic monomer syrup contains from about 5% to about 30% of an acrylic polymer having a reduced viscosity of between 0.4 and 8.0, preferably between 0.4 and 3.5, desirably 0.8 to 2.0, and the syrup is polymerised in the presence of from 0.02–3.0% by weight of a cross-linking agent under conditions such that the reduced viscosity of the final polymer of the sheet when prepared in the absence of the cross-linking agent is between 1.5 and 4.0, preferably between 2.0 and 3.5. The value for the reduced viscosity of the polymer prepared in the absence of cross-linking agent can of course, be lower or higher than the reduced viscosity of the polymer in the syrup and will be an average value determined by the molecular weight species forming the final polymer.

The most suitable concentrations of cross-linking agent used in the process of our invention are chosen by determining the tensile characteristics of the fully polymerised sheet containing various levels of cross-linking agent. These tensile characteristics are conveniently determined from tensile measurements on a test sample of the dimensions described on page 293 of Volume 7 of "Encyclopedia of Polymer Science" published by Wiley and Son 1967 in an article entitled "Fracture" and sub-titled "Short Term Phenomena", cut from an acrylic sheet of approximately 3 mm in thickness. The tensile characteristics of such a specimen may be determined by clamping the specimen vertically in a Davenport tensile testing machine fitted with an oven operable at 165° C. ± 1° C. After allowing 15 minutes for the sample to reach equilibrium the sample is extended at a rate of 1.25 cm/min.

The load on the specimen during extension is measured by a load cell based on electric resistance strain gauges. The load cell signal is fed to a pen recorder giving a permanent record of a load-versus-time curve. A load-versus-extension-to-break curve may readily be constructed from this information.

In an improved method of assessing the tensile characteristics of these polymers an "Instron" Universal Testing Instrument may be used in conjunction with a cross-section area compensator, enabling the recorder to display a stress-versus-clamp separation curve. This can readily be converted to a stress-versus-extension curve. (In the case of both tests the extension is plotted along the abscissa axis and the load or stress is plotted along the ordinate axis). The test differs from the test described with reference to the Davenport tensile testing machine only in that the sample is extended at a slightly slower rate (1.0 cm/min) and that the curve obtained is compensated for any change in cross-sectional area occurring in the specimen. Typical results obtained with the Instron machine from samples of sheets of polymethyl methacrylate of various reduced viscosity but not containing cross-linking agent are illustrated in FIG. 1. It is seen that the stress required to extend a sample of reduced viscosity 5.2 increases steadily to a maximum at about 100% extension before decreasing and eventual breaking of the sample at an extension-to-break value of about 200% extension. For a low molecular weight material (reduced viscosity 1.2) the maximum stress required is again reached at about 100% extension the stress required then decreasing steadily to about 400% extension. This behaviour results from the phenomenon known as necking in which the cross-section decreases rapidly over a small portion of the sample without breaking occurring. In terms of practical use this means that the sheet should be extended during thermoforming but not more than 100% if a non-uniform thinning of the thickness of the thermoformed sheet is to be avoided. Sheet made according to the process of the invention on the other hand has much greater extensibility and by comparison with the conventional sheet requires a smaller load to reach a given extension.

Significant improvements in thermoforming over conventional sheet are produced when the conditions used in the process are such that the reduced viscosity of the sheet when made in the absence of cross-linking agent, hereinafter termed the "backbone reduced viscosity", does not exceed 4.0. Although improvements over conventional sheet can be obtained with a "backbone reduced viscosity" of less than 1.5 it is desirable to obtain a value of at least 1.5 in order not to depart significantly from the properties of the conventionally produced sheet. For example, this invention provides a sheet with improved tensile characteristics but retaining the excellent weather resistance and craze resistance of conventionally produced cast acrylic sheet. Additionally, properties such as impact strength are maintained without significant departure from those of standard cast acrylic sheet. Significant improvements over conventional sheet are noticed in practice if the sheet has an "extension-to-break" value of at least 600% and the load or stress required at 600% extension is greater than the load or stress applied at 100% extension although worthwhile advantages over conventional sheet may be obtained with sheet having an "extension-to-break" of less than 600%. It is preferred that the sheet should have an extension of at least 600% and that the slope of the load or stress-versus-extension curve should be positive at 600% extension, that is to say, the load or stress required for extension at 600% extension should be still increasing.

It is to be understood that the terms "load", "stress" and "extension-to-break" as used throughout this specification are used solely with reference to the standardised tensile tests described using either the "Davenport" tensile testing machine or the "Instron" Tensile Testing Instrument.

In order to produce acrylic sheet according to the invention which has the tensile properties specified the concentration of cross-linking agent must be restricted within fairly narrow limits. These limits are primarily determined by the efficiency of the cross-linking agent and by the polymerisation conditions used in the polymerisation stage carried out in the presence of the cross-linking agent. Thus for a strong cross-linking agent the concentration limits required for a given extension will be lower than for a less efficient cross-linking agent and for a given cross-linking agent slightly more cross-linking agent will be required when the reaction conditions employed are such that in the absence of cross-linking agent a low value of reduced viscosity is obtained than when the reaction conditions used are such as to give a high value of reduced viscosity in the absence of cross-linking agent.

The limits for a particular cross-linking agent are determined experimentally. For a strong cross-linking agent such as glycol dimethacrylate, hereinafter known as GDM, it has been found that acrylic sheet having suitable extensibility is produced when at least about 0.02% of GDM by weight of the syrup is employed. Preferably, the concentration of GDM or other cross-linking agent should not be so high that the degree of cross-linking is excessively high resulting in a sheet having an extension-to-break value of less than 600% (determined as hereinafter described). The upper limit for the cross-linking agent concentration required to give an extension-to-break value of at least 600% has been found to be about 0.2% when using GDM or any other strong cross-linking agent. The preferred range is from 0.04% to 0.15% of GDM, desirably 0.04% to 0.08%.

The concentration limits required to ensure obtaining a sheet having the desired properties, for example, an extension-to-break value of at least 600%, may readily be determined experimentally for any cross-linking agent. For a less efficient cross-linking agent such as triallyl cyanurate it has been found that sheet having an extension-to-break value of at least 600% is obtained using from about 0.1% up to about 1.0% of triallyl cyanurate. Similarly, for diallyl phthalate the useful range is from about 0.3% up to about 1.5%. Other suitable cross-linking agents include allyl methacrylate, allyl acrylate, triallyl phosphate, diallyl maleate, methallyl acrylate, vinyl methacrylate, divinyl benzene, diethylene glycol dimethacrylate and triethylene glycol dimethacrylate.

Depending on the cross-linking agent employed the concentration required to give the improved thermoforming properties may be between 0.02% and 3.0% by weight of the final sheet.

When the polymerisation of the monomer or the polymer-in-monomer syrup is carried out in the presence of a cross-linking agent some of the polymer formed in the presence of the cross-linking agent is of a linear nature and is not substantially cross-linked. The amount of such linear polymer formed is dependent on the reaction conditions employed and on the concentration and type of cross-linking agent present, being at a minimum when the concentration of cross-linking agent used is at a maximum and the cross-linking agent used is a strong one. Thus if 0.06% of a cross-linking agent such as glycol dimethacrylate is added to a syrup containing 15% of linear polymer (by weight of syrup) the finally polymerised product can contain from about 25% to 60%, depending on the polymerisation conditions employed, of a polymer which may be extracted using a solvent such as chloroform and is regarded as substantially linear. With a concentration of 0.2% of glycol dimethacrylate but otherwise identical conditions the amount of soluble material present in the fully polymerised sheet is less than when using 0.06% cross-linking agent but is still greater than the polymer content of the original syrup. When a less efficient cross-linking agent such as triallyl cyanurate is used at a low concentration, for example 0.1%, even higher concentrations of extractable polymer may be formed. In order to obtain products showing worthwhile advantages in thermoforming properties the concentration and type of cross-linking agent and the reaction conditions employed should be such that at least 5% by weight of the fully polymerised sheet is present as an insoluble fraction as determined by the standard test hereinafter specified to determine the amount of soluble polymer present in the sheet.

It is not possible to characterise the sheet formed from the process of this invention in terms of the solution viscosity of both its constituent parts when prepared in the presence of cross-linking agent because although a soluble and probably substantially linear fraction may be extracted using a suitable solvent and characterised by means of its reduced viscosity, the cross-linked component is not amenable to any treatment which permits its molecular weight to be assessed.

The final sheet may nevertheless be conveniently characterised by measuring its behaviour on extension under the specified conditions hereinbefore described. Using the testing conditions specified it has been found that the sheet provided by the process of this invention has an extension-to-break value of, for example, at least 600% and the stress or load required at 600% extension is greater than or not significantly lower than the load at 100% extension. Preferably the sheet has an extension-to-break value of at least 600% and the slope of the stress or load-versus-extension curve is positive at 600% extension.

Accordingly there is provided a thermoformable acrylic sheet comprising an intimate blend of from about 10% to about 95% (by weight of the fully polymerised sheet), preferably 15% to 50%, of a soluble acrylic polymer fraction having a reduced viscosity of not more than 4.0, preferably between 0.8 and 2.0 and from about 90% to about 5% preferably 85% to about 50% of an insoluble lightly cross-linked polymer fraction wherein the fully polymerized acrylic sheet has an extension-to-break value, measured under the standard conditions hereinbefore of at least 600%. Preferably the stress or load required to give an extension of 600% is greater or not significantly less than the stress or load required to give an extension of 100% because sheets having these properties show a greatly reduced tendency to necking or thinning during extension.

The reduced viscosity of the soluble acrylic polymer fraction may be determined as previously stated by extraction with a suitable solvent and subsequent measurement of the reduced viscosity as measured at 25° C. on a solution in chloroform containing 1 g of polymer in 100 cm$^3$ of solution. In practice it has been found that it is not possible to extract quantitatively all the soluble polymeric material known to be present in the final sheet. For instance when a linear polymer of high reduced viscosity is prepared in a first syrup stage it has not been found possible to isolate a soluble fraction containing this high reduced viscosity linear polymer by repeated extraction with a solvent. The term "soluble acrylic polymer fraction" is therefore defined as the polymer extracted under standard test conditions hereinafter specified. Using these specified conditions it has been found that in order that the extension-to-break value of the final sheet should be at least 600% the reduced viscosity of the "soluble acrylic polymer fraction" should not exceed 4.0 preferably being between 0.8 and 2.0.

In the preparation of the sheet the procedures used are basically those known in the art. In the two-stage process described the polymerisable syrup containing a preformed acrylic polymer may be prepared either by dissolving a suitable preformed polymer made by any conventional process, such as the bulk, granular or emulsion polymerisation processes, in an acrylic monomer or by the partial polymerisation of acrylic monomer to give an acrylic polymer-in-acrylic monomer syrup. When a syrup containing less than about 5% by weight of polymer is employed in a casting process difficulties may be experienced due to the low viscosity syrup leaking past the peripheral gasket or other retaining means used in the process. On the other hand if the viscosity of the syrup is excessively high difficulties may be experienced in the process of filling the casting apparatus with such a syrup. It is usually impracticable in the casting process to use a syrup having a polymer content of more than about 30%. Sheet having satisfactory tensile properties may be produced in a process in which the cross-linking agent is introduced after 30% of linear polymer has been formed but as indicated the production of such sheet by the casting process is limited by practical considerations.

When a two-stage process is used the polymer present in the polymerisable syrup before the introduction of the cross-linking agent, regardless of the method of preparation of the syrup, should have a reduced viscosity of between 0.4 and 8.0 preferably between 0.8 and 2.0.

The molecular weight of the polymer is such a preliminary syrup is mainly controlled by the type and concentration of catalyst used, the use of chain transfer agents and the temperature of polymerisation. It is preferred to use in the syrup stage a free-radical catalyst which has a half-life of less than 6 minutes when measured at 85° C., and to use it at a concentration chosen to ensure that at a convenient polymerisation temperature the polymer has a reduced viscosity between 0.8 and 2.0. Such catalysts include peroxydicarbonates such as di-isopropyl, di-n-butyl, di-isobutyl, dicyclohexyl or bis-(4-t-butylcyclohexyl) peroxydicarbonate ("Perkadox" 16 supplied by Novadel Limited), and t-butyl perpivalate. These may be used at concentrations of between 0.008 and 2% by weight of monomer used. Di-isopropyl peroxydicarbonate and bis-(4-t-butylcyclohexyl) peroxydicarbonate are preferred. Although the preferred catalysts have a half life of less than 6 minutes at 85° C. the conventional catalysts such as azodiisobutyronitrile may also be used. It is convenient to use a concentration such that the catalyst is substantially consumed during the syrup stage by the time that polymer of the required reduced viscosity has been formed. This concentration will depend on the catalyst used and may be conveniently determined by routine experiment.

The syrup for use in the casting process may for example be prepared by heating a mixture of monomer and catalyst at a temperature of between 70° C. and 90° C. and maintaining the temperature within this range until the polymer contained in the syrup has a reduced viscosity in the required range. At this point the syrup may be cooled to prevent further reaction until such time as it is required to complete the polymerisation.

In the method of the invention, which may be a second stage following an in situ preparation of the syrup, a cross-linked polymer fraction is prepared by polymerising the syrup in the presence of a cross-linking agent.

The molecular weight of the material prepared in the second stage may be controlled as indicated above by the concentration and type of cross-linking agent employed and by the reaction conditions such as the catalyst concentration, the polymerisation temperature and the use of materials, known as chain-transfer agents, which limit the chain length of the polymer produced.

In order to obtain an acrylic sheet according to the invention the polymerisation conditions used in the second stage polymerisation must be such that the fully polymerised polymer of the sheet has a reduced viscosity of between 1.5 and 4.0 when made in the absence of cross-linking agent.

The catalyst used may be any of the conventional free-radical catalysts such as peroxides and azonitriles, for example lauryl peroxide, benzoyl peroxide, $\alpha,\alpha'$-azodiisobutyronitrile or the peroxydicarbonates previously mentioned. The concentration used is dependent on the temperature at which the second stage of the polymerisation is carried out. The second stage of the polymerisation may be conveniently carried out at temperatures between 60° C. and 120° C. and catalyst concentrations in the range 0.005–0.3% are normally used.

Any conventional chain-transfer agent may be used to limit the chain length of the polymer produced. Examples of convenient compounds are sulphur-containing compounds such as the alkyl or aryl mercaptans, particularly octyl, lauryl and n-, s- and t-dodecyl mercaptans, the esters of mercaptoacetic acid such as glycol dimercaptoacetate, and iso-octyl thioglycollate. The chain-transfer agent may alternatively be hydrocarbon such as benzene, toluene, triphenylmethane, limonene, terpinolene, $\alpha$-, $\beta$- or $\gamma$-terpinene or 1-4 cyclohexadiene. Again chlorinated compounds such as chloroform, carbon tetrachloride, benzyl chloride or methallyl chloride may be used. The concentration of chain-transfer agent employed will depend on the efficiency of the chain-transfer agent and in general concentrations between 0.002 to 0.2% by weight of the total monomer used are normally used.

The sheets of this invention may be used in a variety of applications in which the excellent physical properties of acrylic sheet may be required, but in particular find use where a sheet having good thermoforming properties is required. Applications include internally illuminated lighting fittings or signs, sanitaryware, decorative facia panels for indoor and outdoor architectural applications, and any glazing applications where a dome or window with a curved surface is required.

In fabrication the sheet of this invention shows advantages not only in providing a means for obtaining more intricately shaped articles with better definition than was previously possible with high molecular weight acrylic sheet but also offers considerable savings in manufacturing costs because of the reduced cycle time made possible by the improvements in shaping properties over a wide range of shaping temperatures.

The invention is illustrated by the following Examples in which parts and percentages are expressed by weight.

EXAMPLE 1

A syrup was prepared by adding 0.003 parts azodiisobutyronitrile and 0.1 parts lauryl mercaptan to 100 parts methyl methacrylate and heating at 90° C. for 2 hours. A further 0.003 parts azodiisobutyronitrile was added to this syrup and the mixture was maintained for a further 2 hours at 90° C. After cooling to 20° C. the polymer content was found to be 11.0% and the reduced viscosity of the polymer was 1.72.

Figure 2:
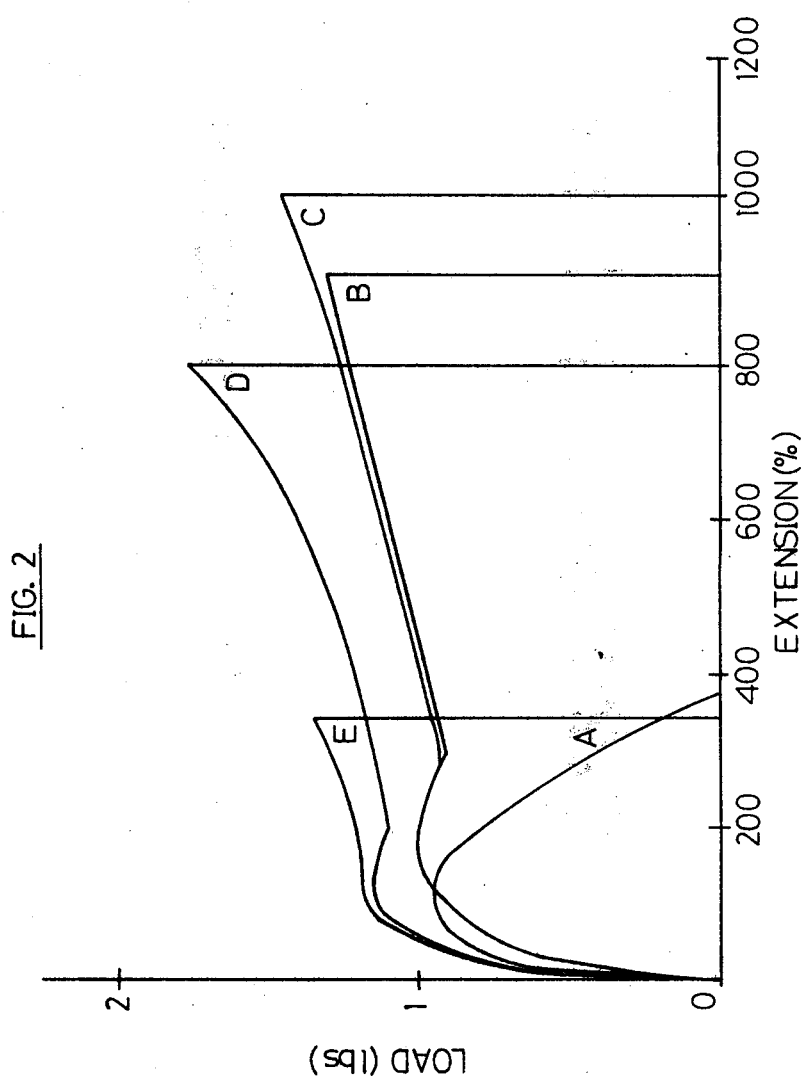

To aliquot portions of this syrup were added 0.012% by weight azodiisobutyronitrile, 0.1% lauryl mercaptan and GDM at concentrations between 0.02 and 0.12%, all percentages being based on the weight of the syrup. These syrups were then poured into glass cells and polymerized by heating for 100 minutes at 98° C. followed by heating for 40 minutes at 115° C. to give sheets having a thickness of about 3 mm. A control run carried out under the conditions described but in the absence of cross-linking agent gave a sheet having a reduced viscosity of 1.97. Samples of the cross-linked sheets were tested according to the method described. The load versus extension-to-break curves obtained using the tensile test described employing the Davenport tensile testing machine are shown in FIG. 2. Curves B, C and D obtained from sheets prepared using 0.04%, 0.06% and 0.10% GDM respectively show extension-to-break values of greater than 600% and have positive slopes when the extension-to-break value is 600%. Curve A obtained from the sheet prepared with 0.02% GDM has extension of less than 400% and does not have the improved thermoforming properties required. Curve E obtained from the sheet prepared with 0.12% GDM also does not have the required thermoforming properties. It may be deduced that materials having the desired thermoforming properties and containing more than 0.1% GDM can be prepared by using reaction conditions in the second stage which in the absence of cross-linking agent would give a product having a reduced viscosity of less than 1.97.

EXAMPLE 2

(i) A syrup having a polymer content of 8% was prepared by adding 0.002 parts azodiisobutyronitrile to 100 parts methyl methacrylate and heating to 80° C.

After the polymer content reached 8% the syrup was cooled to 20° C. The reduced viscosity of the polymer was found to be 2.99.

To the syrup was added 0.2% bis(4-t-butylcyclohexyl) peroxydicarbonate 0.003% azodiisobutyronitrile and 0.08% GDM. The syrup was polymerised between glass plates at 90° C. for 100 minutes and then for 30 minutes at 115° C.

(ii) The procedure was repeated starting with a syrup prepared by adding 0.014% bis(4-t-butylcyclohexyl) peroxydicarbonate to 100 parts methyl methacrylate and heating at 80° C. until the polymer content reached 16%.

Sheet made in these two experiments was tested according to the extension test used in Example 1. For the sheet made according to experiment (1) a curve was obtained with an extension-to-break value of 830% and a positive slope at 600% extension. The sheet made according to experiment (ii) had an extension-to-break value of 700% and the curve had a positive slope at 600% extension.

EXAMPLE 3

100 parts methyl methacrylate and 0.01 parts diisopropyl peroxydicarbonate were mixed together in a stirred vessel and heated to 90° C. to initiate polymerisation. When the polymer content of the mixture reached 17% the contents were cooled to 25° C. The reduced viscosity of the polymer in the syrup was found to be 0.9.

0.035 parts diisopropyl peroxydicarbonate and 0.06 parts GDM were added to this syrup and the syrup was polymerised using the procedure of Example 1. A control run prepared under the conditions described but in the absence of cross-linking agent had a reduced viscosity of 1.7. A sample of the fully polymerised cross-linked sheet was tested by means of the extension method used in Example 1 described and was found to have an extension-to-break value of more than 600% and the slope of the load-versus-extension curve was positive at an extension of 600%.

EXAMPLE 4

A series of experiments were carried out to determine the concentration of triallyl cyanurate required to give a product having the desired shaping properties. A batch of syrup was prepared by heating 100 parts of methyl methacrylate with 0.014 parts of bis(4-t-butylcyclohexyl) peroxydicarbonate at 80° C. in a stirred vessel. The mixture was maintained at 80° C. until the solids content of the syrup had reached 15% and was then cooled to about 25° C. The reduced viscosity of the polymer in the syrup was 1.30. Aliquot portions of this syrup were then made up containing the following ingredients:

"Perkadox" 16: 0.2%
Triallylcyanurate: variable between 0% and 0.75

Each portion of syrup was poured into a polymerisation cell and polymerised using a cycle of 100 minutes at 90° C. followed by 15 minutes at 115° C. After cooling transparent sheets having a thickness of about 3 mm were removed from the mould. A control run performed under the same conditions but in the absence of cross-linking agent gave a sheet with a reduced viscosity of 1.98. Test specimens were cut from the cross-linked sheets and tested according to the methods previously described.

The extension results obtained using the test employed in Example 1 are detailed in the following Table.

| Concentration of Triallyl cyanurate (%) | Extension-to-break value (%) | Slope of curve at 600% extension |
|---|---|---|
| 0.2 | 580 | — |
| 0.3 | 870 | positive |
| 0.5 | 640 | positive |
| 0.75 | 390 | — |

EXAMPLE 5

The procedure of Example 4 was repeated to determine the range of concentration of triallyl phosphate required to give sheet according to the invention when using the polymerisation conditions of Example 4. The extension values obtained by the test procedure used in Example 1 are recorded in the following Table.

| Concentration of triallyl phosphate (%) | Extension-to-break value (%) | Slope of curve at 600% extension |
|---|---|---|
| 0.1 | 280 | — |
| 0.3 | 1580 | positive |
| 0.5 | 1000 | positive |
| 0.75 | 570 | positive |

EXAMPLE 6

Usiung the polymerisation conditions detailed in Example 4 allyl methacrylate was evaluated at concentrations of 0.5 and 0.75%. The fully polymerised sheets were evaluated using the extension test of Example 1. A sheet having an extension-to-break of less than 600% was obtained using 0.5% allyl methacrylate. Using 0.75% allyl methacrylate a sheet having an extension-to-break of 1250% was obtained.

EXAMPLE 7

Using the polymerisation conditions of Example 4 diallyl phthalate was evaluated at concentrations between 0.3% and 1.0%. Extension-versus-load curves were obtained from the fully polymerised sheets by the method used in Example 1.

The values obtained are shown in the following Table.

| Concentration of diallyl phthalate (%) | Extension-to-break value (%) | Slope of curve at 600% extension |
|---|---|---|
| 0.3 | 215 | — |
| 0.6 | 720 | negative |
| 0.75 | 1035 | negative |
| 1.0 | 990 | positive |

EXAMPLE 8

A syrup was prepared by adding 0.01 parts of diisopropyl peroxydicarbonate and 0.1 parts lauryl mercaptan to 100 parts methyl methacrylate and heating at 80° C. until the polymer content had reached 10.5%. The mixture was then cooled to 25° C.

To this syrup was added 0.2% "Perkadox" 16 and 0.06% GDM. To simulate the conditions used in the continuous moving band process of casting the syrup was poured into a stainless steel cell and polymerised at 85° for 100 minutes. The reaction temperature was then raised to 115° C. and held at that temperature for 15 minutes. A control run carried out in the absence of cross-linking agent but under otherwise identical conditions gave a final sheet having a reduced viscosity of 1.69. The tensile properties of the sheet prepared in the presence of cross-linking agent were evaluated using the test described employing the Instron Universal Testing Instrument. An extension-to-break value of 640% was obtained and the slope of the stress versus extension curve was positive at an extension of 600%.

EXAMPLE 9

"Perkadox" 16 (0.2 parts) and GDM (0.06 parts) were added to methyl methacrylate monomer (100 parts). The mixture was poured into a stainless steel cell and treated for 100 minutes at 90° C. followed by 30 minutes treatment at 115° C. A control run without GDM gave a sheet with a reduced viscosity of 2.47. The extension-to-break value of the final cross-linked sheet using the extension test employed in Example 8 was 640% and the slope of the stress versus extension curve was positive at 600% extension.

EXAMPLE 10

A syrup was prepared by adding 0.01 parts diisopropyl peroxydicarbonate and 0.1 parts lauryl mercaptan to 100 parts methyl methacrylate and heating at 85° C. until the polymer content had reached 16%. The mixture was cooled to below 25° C. and was found to have a reduced viscosity of 1.03.

To this syrup was added 0.08% GDM, 0.1% lauryl mercaptan and 0.05% azodiisobutyronitrile. The mixture was then poured into glass cells and polymerized at 68° C. for 5 hours. The reaction temperature was then raised to 110° C. and held at this temperature for 15 minutes. A control run carried out under the conditions described but in the absence of cross-linking agents gave a sheet having a reduced viscosity of 1.8. A sample of the cross-linked sheet was tested according to the extension method used used in Example 1 and was found to have an extension-to-break value of 800%. The slop of the extension-versus-load curve was positive at an extension of 600%.

EXAMPLE 11

A syrup having a polymer content of 8% was prepared by adding 0.002 parts azodiisobutyronitrile to 100 parts methyl methacrylate at 80° C. After the polymer content reached 8% the syrup was cooled to about 25° C. The reduced viscosity of this polymer was found to be 3.0.

To this syrup was added 0.065% of 2,2'-azobis-(2,4-dimethyl valeronitrile) and 0.02% GDM. The mixture was poured into glass cells and treated for 100 minutes at 90° C., followed by 15 minutes at 115° C. A control run without GDM gave a sheet with a reduced viscosity of 3.7. The extension-to-break value of the cross-linked sheet measured according to the test used in Example 8 was 800%, and the slope was positive at an extension of 600%.

The amount of soluble polymer present in the fully polymerised cross-linked sheet was then determined by the following standard test:

About 2 grams of cross-linked sheet approximately 3 mm thick was weighed accurately and placed in 150 ml chloroform. This mixture was left at room temperature with continuous shaking on a mechanical shaker for 24 hours. The mixture was then filtered through a No. 1 Whatman filter paper to remove as much of the chloroform solution as would readily separate from the swollen sheet. This volume was recorded. (A ml.). By evaporation to dryness at 100° C. the weight of polymer ($x$ grams) in this solution was obtained.

The total amount of soluble polymer in the sample of sheet was then obtained by applying the formula $y = x/A \times 150$, where $y$ is the weight in grams of the soluble fraction in the sheet.

Using this test it was found that the fully polymerised cross-linked sheet of this example contained 18% of soluble material. The reduced viscosity of this material was found to be 1.0.

EXAMPLE 12

Polymerisations were conducted as described in Example 11 using 0.1% and 0.2% of triallyl cyanurate respectively in place of the GDM. The fully polymerised sheet containing 0.1% triallyl cyanurate had an extension-to-break value of 800% as measured by the test used in Example 8. The stress required at 600% extension was approximately 25% less than the stress required at 100% extension. Analysis of the soluble material according to the test used in Example 11 showed that 93% of the sheet was soluble under the specified conditions.

The fully polymerised sheet made in the presence of 0.2% triallyl cyanurate had an extension-to-break value of 1000% and a stress at 600% extension equal to that required at 100% extension. The final sheet was found to contain 64% of soluble material according to the standard extraction test. The reduced viscosity of this soluble fraction was found to be 2.0.

I claim:

1. A thermoformable acrylic sheet comprising an intimate blend of 10–95% by weight of a acrylic polymer fraction soluble in chloroform having a reduced viscosity of not more than 4.0 and 5–90% by weight of an acrylate polymer fraction wherein the reduced viscosity of the fully polymerized sheet when made in the absence of cross-linking agent is between 1.5 and 4.0, said acrylate polymer fraction containing sufficient cross-linking agent to improve the tensile properties of the sheet in comparison with the sheet made in the absence of cross-linking agent.

2. A thermoformable acrylic sheet according to claim 1 in which the reduced viscosity of the sheet in the absence of cross-linking agent is between 2.0 and 3.5.

3. A thermoformable acrylic sheet according to claim 1 in which the reduced viscosity of the sheet in the absence of cross-linking agent is at least 2.0.

4. A thermoformable acrylic sheet according to claim 1 wherein the sheet has an "extension-to-break" value of at least 600%.

5. A thermoformable acrylic sheet according to claim 4 in which 15–50% by weight of the soluble polymer fraction is present.

6. A thermoformable acrylic sheet according to claim 4 wherein the stress required to stretch the sheet to an extension of 600% is not significantly less than the stress required to give an extension of 100%.

7. A thermoformable acrylic sheet according to claim 4 wherein the slope of the load or stress versus extension curve is positive at an extension of 600%.

8. A thermoformable acrylic sheet according to claim 4 in which the soluble polymer fraction has a reduced viscosity of 0.8–2.0.

* * * * *